United States Patent [19]

Dessauer

[11] 4,232,108

[45] * Nov. 4, 1980

[54] MARKING TRANSFER SHEETS

[75] Inventor: Rolf Dessauer, Greenville, Del.

[73] Assignee: E. I. Du Pont de Nemours and Company, Wilmington, Del.

[*] Notice: The portion of the term of this patent subsequent to Jun. 14, 1996, has been disclaimed.

[21] Appl. No.: 35,106

[22] Filed: May 1, 1979

Related U.S. Application Data

[60] Division of Ser. No. 884,500, Mar. 8, 1978, which is a continuation-in-part of Ser. No. 617,540, Sep. 29, 1975, abandoned, which is a continuation-in-part of Ser. No. 516,483, Oct. 21, 1974, abandoned.

[51] Int. Cl.$^2$ .......................... G03C 1/90; G03C 1/52; G03C 5/24; G03C 5/04
[52] U.S. Cl. .................................. 430/259; 430/338; 430/346; 430/541
[58] Field of Search .................... 96/27 R, 48 PQ, 83, 96/90 R; 428/43, 913, 914; 427/54, 56, 51; 250/318; 430/338, 346, 259, 541

[56] References Cited

U.S. PATENT DOCUMENTS

| | | | |
|---|---|---|---|
| 2,409,564 | 10/1946 | Heinecke et al. | 83/8 |
| 2,510,750 | 6/1950 | Marquardt | 154/99 |
| 2,596,754 | 5/1952 | Yackel | 156/230 |
| 2,643,950 | 6/1953 | Umberger | 156/272 |
| 3,536,490 | 10/1970 | Hochberg | 96/47 |
| 3,565,618 | 2/1971 | Marechal | 96/28 |
| 3,578,450 | 5/1971 | Miller et al. | 96/29 R |
| 3,615,454 | 10/1971 | Cescon et al. | 96/35.1 |
| 3,658,543 | 4/1972 | Gerlach et al. | 96/90 R |
| 3,660,086 | 5/1972 | Tamai et al. | 96/1.7 |
| 3,736,142 | 5/1973 | Kaspaul et al. | 96/90 R |
| 3,753,718 | 8/1973 | Lonczak | 96/88 |
| 3,810,763 | 5/1974 | Laridon et al. | 96/48 R |
| 3,871,886 | 3/1975 | Robillard | 96/48 R |
| 4,029,506 | 6/1977 | Dessauer | 96/48 PQ |

*Primary Examiner*—Richard L. Schilling

[57] ABSTRACT

A marking transfer sheet comprising an imaging layer of pigment, binder and a color-forming, radiation-sensitive component on a carrier film and a process for its use comprising exposing the imaging layer to a pattern of radiation to form a mark, heating the imaging layer until adhesive, and contacting the imaging layer with a support more adherent to the imaging layer than the carrier film; and optionally separating the carrier film from the imaging layer.

9 Claims, No Drawings

MARKING TRANSFER SHEETS

CROSS-REFERENCE TO RELATED APPLICATION

This is a division of application Ser. No. 884,500, filed Mar. 8, 1978, which is a continuation-in-part of copending application Ser. No. 617,540, filed Sept. 29, 1975, now abandoned, which is a continuation-in-part of application Serial No. 516,483, filed Oct. 21, 1974, now abandoned.

BACKGROUND OF THE INVENTION

Field of the Invention

This invention relates to marking transfer sheets and particularly marking transfer sheets which are man and machine readable. More particularly, this invention relates to a process for marking an object using the marking transfer sheets.

Continuing effort has been directed toward the development of more satisfactory means for inventory control and supermarket checkout procedures. These efforts have resulted in a Universal Product Code (UPC), presented as an array of bars and spaces. Codes of this type are readable by a diffuse reflectance scanning means.

Despite the overall workability of this system, difficulty has been encountered in the development of a satisfactory means for applying the coded message. Traditional graphic art printing techniques, using two inks for the bars and the spaces, respectively, are limited by the tendency of the ink to spread during application. Moreover, the UPC system has minimum contrast requirements between the bar code and the background, since the coded information is read by detecting diffusely scattered light as reflected by the bars and the background. In addition, certain products and marking apparatus required the preparation of marks before application to the product. Accordingly, a continuing need exists for a reliable system for applying UPC code marks efficiently and accurately to a wide variety of substrates.

The present invention provides a marking transfer sheet particularly well suited for the application of marks such as UPC code labels, and a process for its use in applying such marks. These transfer sheets, when so used, result in the contrast required for this system independent of the reflective properties of the substrate, and provides a simplicity, precision and economy heretofore not available.

SUMMARY OF THE INVENTION

In accordance with this invention there is provided a marking transfer sheet comprising an imaging layer on a carrier support, the imaging layer comprising (a) a radiation-sensitive composition which, upon exposure to radiation, is capable of forming a colored substance that can absorb at least a portion of the wavelength of light in the visible spectrum, the radiation-sensitive composition being present in an amount sufficient to produce, upon exposure to radiation, a detectable difference in diffuse reflectance density between exposed and unexposed areas, (b) pigment capable of diffusely reflecting the wavelengths of light absorbed by the colored substance, the pigment being present in a density of about from 0.05 to 0.34 grams per square foot, and (c) radiation-transmissive, colorless, polymeric, film-forming, thermoplastic binder.

The invention further provides a process for marking an object using these transfer sheets by imparting an image to the radiation-sensitive composition through exposure to a pattern of radiation of a wavelength to which the radiation-sensitive composition is sensitive to produce a detectable difference in diffuse reflectance density between exposed and unexposed areas; heating the image layer to a temperature of about from 40° to 220° C. at which the outer surface of the layer is adhesive; and contacting the outer surface of the imaging layer with a receiving support which is more adherent to the imaging layer than the carrier support; and optionally separating the carrier support.

DETAILED DESCRIPTION OF THE INVENTION

Radiation-sensitive components which can be used in the present invention include any of the known compositions that are normally colorless and unaffected by ambient light conditions but are colored by exposure to suitable electromagnetic radiation. Particularly satisfactory are those described in Hughes U.S. Pat. No. 3,639,762 issued Feb. 1, 1972, hereby incorporated by reference. That patent discloses appropriate ambient light conditions and sources of electromagnetic radiation for forming colored substances from the radiation-sensitive compositions listed. Such components are substantially colorless. However, slight color present before irradiation will not interfere with attaining sufficient contrast between UPC bars and spaces under examining colored light. Typically, such radiation-sensitive components comprise dye-forming materials but can contain still other materials to fix the dye image against further color change. These compositions are photoimageable and photofixable and are dry processing in that they require no treatment other than irradiation with two different types of irradiation.

Other radiation-sensitive components which can be used are the photoimaging-heat fixing systems which are also dry processing, requiring only light and heat and no chemical treatment whatsoever to develop and fix the image. Such a system is shown in detail in Manos, U.S. Pat. No. 3,390,995, hereby incorporated by reference. UV-sensitive components which include various chemical, thermal, or light-activated (photofix) agents as known in the art and described in U.S. Pat. Nos. 3,390,994; 3,390,995; 3,390,996; 3,445,234; 3,630,736; 3,615,454 and 3,658,543, can also be used in the present invention.

Reflective pigments which can be used in this invention must be capable of diffusely reflecting the wavelengths of the examining light, the amount of such a pigment being at least sufficient to opacify the surface of the marked object. The pigment is accordingly present in such quantity as will result in a coating density of about from 0.05 to 0.34 grams per square foot.

The maximum pigment concentration should provide a substantial difference in diffuse reflectance density between exposed and unexposed areas. The density difference as measured with a MacBeth Reflectance Densitometer, using a visual filter that approximates the sensitivity of the eye, should be at least about 0.3 between exposed and unexposed areas which corresponds to easy human eye readability. For opacification of the substrate, the reflectance density of the unexposed areas normally is 0.4 or less, based on a comparison object such as a standard magnesium carbonate surface.

The ability to form an easily readable symbol with the human eye is desirable. For machine readability, the criteria are more critical, being set forth in the UPC specifications, to permit interaction of symbols with scanning devices. At concentration levels of up to 34% by weight pigment concentration, at which coverage of a dark substrate is substantially complete, eye readable, but not machine readable images can be generated with a Print Contrast Signal (PCS) of 0.36. For successful machine scanning, a higher contrast is required, i.e., at least 0.7 optical density over background and corresponding PCS ratios.

Specific materials which can be used as pigments in this invention include paper, felt, natural and synthetic fibers, plastics, ceramics, and powdered glass (silica), as well as inorganic oxide, sulfide, and carbonate powders. Especially suited however are particulate metal oxide and sulfide pigments, particularly those in which the metal is a polyvalent heavy metal having an atomic number of at least 21, heavy metal being defined as in H. G. Deming's Fundamental Chemistry, Second Edition, John Wiley and Sons. Representative pigments are antimony and bismuth trioxide; hafnium, zirconium, and bismuth dioxide; lead monoxide; tin dioxide; yttrium oxide; zinc, cadmium, and mercuric oxides. Suitably colored corresponding sulfides can also be used, e.g., zinc sulfide. Especially preferred are $TiO_2$ (rutile), ZnO (including zincite), zinc sulfide (wurtzite, sphalerite, blende) including lithopone, $SnO_2$ and $ZrO_2$.

The particular pigment chosen should, of course, be compatible with the radiation-sensitive composition and the colored substance produced therefrom upon irradiation in the marking step.

The pigment can be selected to adsorb upon its surface the dye developed by irradiation. Acidic oxides can be employed in combination with photosensitive components that develop cationic dyes. Most preferably, titanium dioxide and a cationic triarylmethane dye-forming component are used in the coating composition.

Colored pigments can sometimes be used for an additional identification purpose, such as designating different classes of goods. However, the color of the pigment should not be so pronounced as to interfere with the minimum required contrast at the wavelengths of the examining light. Yellow cadmium sulfide pigment, for example, is compatible with the development of red light-absorbing dye.

The diffuse reflectances afforded by various pigments vary depending upon their chemical nature and average particle or fiber sizes. Visible light scattering is known to be a function of the surface area per gram. Accordingly, the smaller the particle size, the greater the visible light scattering power. Pigments having an average particle size of about from 0.04 to 50 microns are commercially available and can be used in this invention. Smaller particle sizes within the stated range are particularly satisfactory. The amount of pigment of given average particle size and scattering surface necessary to meet reflectance and contrast criteria defined herein can be readily determined by those skilled in the art. In general, lower quantities of smaller size pigment particles are needed.

The film-forming thermoplastic binder, in order to transfer from a carrier support to a receiving support at the specified transfer temperature, must have greater adhesion to the surface of the receiving support than to the surface of the original carrier. The binder should be capable of transmitting sufficient radiation to the radiation-sensitive component to form the colored substance in a reasonably short time, so as not to unduly impede marking operations. The light absorbing properties of the binder should be compatible with those of the radiation-sensitive composition, the dye produced therefrom and the pigment. The binder should be capable of transmitting the examining colored light corresponding to the absorption color developed by the photosensitive component. Normally it will be substantially colorless.

The polymeric binder also contributes dimensional stability, i.e., maintains the widths and locations of exposed and unexposed areas established during exposure until such time that the markings can be read by a scanner.

Representative thermoplastic polymeric binders which can be used include vinylidene chloride copolymers such as vinylidene chloride/acrylonitrile, vinylidene chloride/methacrylate and vinylidene chloride/vinyl acetate copolymers; ethylene/vinyl acetate copolymers; cellulosic ethers such as methyl cellulose, ethyl cellulose and benzyl cellulose; cellulose esters such as cellulose acetate, cellulose acetate succinate and cellulose acetate butyrate; synthetic rubbers such as butadiene/acrylonitrile copolymers, and chloro-2-butadiene-1,3 polymers; polyvinyl esters such as polyvinyl acetate/acrylate, polyvinyl acetate/methacrylate and polyvinyl acetate; polyvinyl chloride and copolymers such as polyvinyl chloride/acetate; polyvinyl acetals such as polyvinyl butyral and polyvinyl formal; polyurethanes; and polyacrylate and alpha-alkyl polyacrylate esters such as polymethyl methacrylate and polyethyl methacrylate.

As will be evident to those skilled in the art, specific binders can be selected for compatibility with the substrate to which the markings are applied and can be modified with additives to modify surface gloss, abrasion resistance, and the like.

At least one ultraviolet light absorbent compound having an absorption in the range of 300–420 nm. can be incorporated into the carrier support, or into an interlayer between the imaging layer and the support. Any of the many known UV absorbers can be used including those in the group of benzophenones, benzotriazoles and nickel complexes. Typical UV absorbers and their preparation are described in Encyclopedia of Chemical Technology, Second Supplement Volume, Editor-Anthony Standen, "Ultraviolet Absorbers", pages 883–902, 1960, The Interscience Encyclopedia, Inc. New York. In a preferred embodiment, a carrier support having UV absorbance is retained over the mark on the product surface for physical protection. The UV absorbance should be sufficient to impede the further imaging of the radiation-sensitive component through the carrier support. This UV absorbance can be imparted by incorporation of UV absorbers as discussed above, or by selection of a carrier support having inherent UV-absorbing qualities, such as "Kapton" polyimide film.

The imaging layer of the present structures is generally prepared by admixing the components in a solvent. The solvent should be volatile at ordinary temperatures and pressures. Examples are alcohols and esters, aromatic hydrocarbons, ketones and miscellaneous solvents in amounts as may be required to attain solution of the radiation-sensitive components.

The order in which ingredients are combined is not critical. The solvent facilitates mixing the ingredients of the radiation-sensitive component, but is largely removed from the coating later by evaporation. It is often beneficial to leave a small residue of solvent in the coating applied to the product surface so that the desired degree of color development can be obtained by irradiation.

Carrier support materials which can be used in the present invention vary widely depending on the nature of the imaging layer and the intended end use, and can include paper; cloth; cellulose esters such as cellulose acetate, cellulose propionate and cellulose butyrate; and other plastic compositions as well as other organic, film-forming compositions such as polyimides. The support can have additives in or on its surface designed to facilitate release of the imaged film from the carrier support at the time of transfer. Representative of such additives is a silica coating as a roughening agent.

Preferred for carrier supports are materials commonly used in the graphic arts and in decorative applications and include paper ranging from tissue paper to heavy cardboard; films or sheets of polyester of glycol and terephthalic acid, vinyl polymers and copolymers, polyethylene, polypropylene, polyvinyl acetate, polymethyl methacrylate and polyvinyl chloride. Opaque as well as transparent supports can be used. Carrier supports that are transparent to activating wavelengths of light for the color-forming reaction can be used if exposure of the photosensitive film through the carrier support is desired. This would result in a right-reading decoration after transfer. Image reversal is normally overcome by proper use of photographic negatives when the coating is exposed directly. The carrier support should be inert to the contacting photosensitive component and binder component of the coating formulation as well as other materials such as solvents and plasticizers that may be present.

The formulation for the imaging layer can be applied to the carrier support using spraying or other convenient means. Typical devices for applying wet films can be used, such as nip fed three roll reverse coating heads, gravure coaters, trailing blade coaters, knife overroll, 4-roll pan fed, and Mayer bar coating heads. The removal of solvent can be done at room temperature, under vacuum at room temperature, by forced air solvent evaporation, or at elevated temperatures. Radiant heating generally should not be used to dry compositions containing IR-sensitive components.

The dry film thickness of the imaging layer should be about from 0.2 to 0.8 mil, and preferably about from 0.2 to 0.5 mil. Coatings less than this are difficult to coat uniformly and often lack sufficient opacity, while thicker coatings reduce the detectable difference in diffuse reflectance density.

After coating of the film onto the carrier support, the coated surface normally exhibits a substantially uniform diffuse reflectance attributable to the pigment dispersed in the coating. Marking requires exposing to appropriate radiation to produce the desired pattern in the coating.

Depending on the nature of the source and pattern-forming optics employed, exposure times will ordinarily vary from a fraction of a second to several minutes. A source of UV or IR radiation is chosen which is appropriate for the radiation-sensitive component used. U.S. Pat. No. 3,639,762 describes the selection and use of radiation sources for various photosensitive marking components, many such combinations being suitable in this invention provided the polymeric binder employed in this invention transmits effective radiation wavelengths. Preferred for use with the preferred UV-sensitive coating compositions described earlier are UV-sources that supply radiation in the region between about 22 nm. and about 420 nm.

The optics used should be capable of forming the particular pattern desired, such as a UPC bar symbol. The radiation is focused on the surface of the imaging layer to mark it with an appropriate symbol. After exposure to radiation, the mark and the remaining radiation-sensitive component can be fixed by chemical or thermal means best suited to the particular composition used.

After photoimaging in the desired pattern with activating light, the image-bearing film is transferred to a receiving support, in a manner that promotes adhesion to the receiving support. This can be done by placing the film in contact with the receiving support and heating. Alternatively, the film can be heated before, after, or before and after contacting the receiving support. Heating can be direct, such as by dielectric or infrared heating. However, it is usually more convenient to heat indirectly, such as by heating either the receiving support or both the receiving support and the carrier support. By heating just the receiving support the surface of the film can be raised to a stick temperature while the surface of the film contacting the carrier support is at a lower temperature. Stick temperatures normally range about from 40° C. to 220° C. depending on fabric and transfer film composition. If the adhesive bond of the film to the carrier support is weak, as with carrier supports of commercial release paper, the adhesion of the film to the receiving support develops as the thermoplastic binder softens to a depth just sufficient to result in a good bond to the receiving substrate. Transfer to the receiving support with release of the carrier support can take place at the stick temperature or thereafter upon cooling to a lower temperature. The pressure applied to the composite should, of course, be adequate to bring the film layer in intimate contact with the receiving support.

After application to the receiving support, the carrier support is generally removed. However, advantages may be realized with certain combinations of radiation-sensitive component and carrier support by retaining the carrier in place. For example, the carrier film can be selected to have an absorption in the same wavelength range as the radiation-sensitive component of the film layer, and accordingly protect the mark from actinic radiation. "Kapton" polyimide film, for example, as described in British Pat. No. 903,271, absorbs blue and UV light. Its retention on the final surface of a mark, therefore, can eliminate the need for fixing agents normally used after exposure of the radiation-sensitive composition.

The end utilization of the objects marked with a Universal Product Code involves illuminating the marking with examining light consisting essentially of wavelengths of light absorbed by the colored substance and reflected by the pigment and then reading information conveyable by the predetermined widths and locations of the exposed areas and unexposed areas with a diffuse reflectance scanning means sensitive to the wavelengths of examining light.

Universal Product Code systems generally use a high-speed scanner using a laser light source, such as a red Helium-Neon laser, to read the code's symbol, although other sources such as incandescent lamps can be used with optical filters interposed either between the source of examining light and the marking it illuminates or between the marking and a detector of the diffusely reflected light.

Known diffuse reflectance scanning means suitable for use in this invention include rotating scanners which rotate a very narrow concentrated light beam from a laser, mercury vapor lamp, or an incandescent lamp at speeds of more than 1,000 revolutions per second; and photocells in a fixed position which scan a mark while it is moving in a fixed path. In some applications newly developed hand-held scanners taking the form of a pen or a wand can be used for recording scanned information directly into portable cassettes for storage before entry into a computer system.

The transfer sheets of the present invention provide a convenient means for applying labels and other markings to a wide variety of surfaces. These products combine a variety of characteristics previously considered incompatible in a label of this type. The transfer sheets, due to the required pigment concentration, opacify the surface of the object to be marked. At the same time, the pigment does not opacify the marking itself. The present transfer sheets can be irradiated for marking from the eventual back side, and the label does not need to be removed from the carrier sheet before being adhered to the new substrate. The readability of the marks imparted to the newly exposed surface of the imaging layer upon transfer is particularly surprising. It would generally be expected that opacification of this layer to an extent that would obscure a colored surface to which it is eventually applied would also obscure the mark on the final top surface of the layer.

The present composition is universally applicable as a pigmented coating to a wide variety of surfaces and provides both the reflective background and the less reflective marking produced upon irradiation. Use of the marking composition as shown herein produces images having good resolution and stability, superior to the images of the mechanical printing system previously used. The accuracy attainable through the present compositions permits a 25% decrease in size of a UPC symbol by avoiding the ink spread problem. In addition, the constraint imposed by mechanical printing system that bars must lie in the press direction is also removed. These factors give greater freedom in package design.

The present transfer sheets permit marking independent of the color and other optical properties of the surface of the object to be marked. They are suitable for marking and reading symbols on specularly reflective metal can surfaces, light transmissive glass bottles, and dark or highly colored product surfaces which may have substantially the same color as that developable by the radiation-sensitive component used in this method. Special selection or modification of the product surface is not necessary. The present transfer sheets are particularly well suited for marking film-wrapped products such as fresh meats, fruits, and vegetables packaged in the store with symbols identifying the product and its price. The present invention, in addition to UPC bar code symbols, can be used for applying other symbols and alphanumerics that involve two areas differing in reflectance.

An advantage of the marking transfer sheets of this invention is that they provide flexibility in design of symbol-generating printers with resulting improved performance characteristics of the transferred pattern. For example, a photosensitive stratum of the invention can be applied to a continuously moving belt, imaged, and transferred to a receptor surface resulting in a man/machine readable object, e.g., glass bottle, metal can, etc.

Another advantage of the invention occurs when a supported imaged photosensitive stratum is adhered to the object which is intended to be marked since the film support can provide protection against environmental effects which could be destructive of the integrity of the label, e.g., chemical spills, moisture, light, etc. Additionally, symbols so protected cannot be altered and thus provide a higher level of security.

The invention is further illustrated by the following specific Examples, in which parts and percentages are by weight unless otherwise indicated.

EXAMPLE 1

A marking composition was prepared by admixing the following ingredients.

| | |
|---|---|
| Binder | |
| Cellulose acetate butyrate | 10.28 g. |
| Pigment | |
| Titanium dioxide, rutile form (Du Pont "Ti-Pure" R Titanium Dioxide Pure) | 1.37 g. |
| Coating Solvent - acetone | 80.14 g. |
| Photosensitive Component | |
| Plasticizer N-ethyl-p-toluenesulfonamide (Monsanto Chemical Company's Santicizer-3) | 2.225 g. |
| Anion Source - Dodecylbenzenesulfonic acid (Richardson Company Richonic Acid B) | 0.856 g. |
| Photooxidizable Leuco Dye - Tris(N,N-diethylamino-o-tolyl) methane | 0.154 g. |
| Photooxidant-2,2'-Bis(o-chlorophenyl)-4,4', 5,5'-tetrakis (m-methoxyphenyl)-1,2'-biimidazole | 0.7153 g. |
| Hydrogen Donor - Triethanolamine triacetate | 1.882 g. |
| Oxidant - Pyrenequinone (1:1 mixture of 1,6- and 1,8-isomers) | 0.0061 g. |
| Oxidant - 9,10-Phenanthrenequinone | 0.10 g. |
| Plasticizer - Polyethylene adduct of o-phenylphenol, average formula $C_6H_5—C_6H_4—O(CH_2CH_2O)_{2.23}—H$ | 1.951 g. |

This composition was sprayed on a yellow polyimide film commercially available from E. I. du Pont de Nemours and Company as "Kapton" Type H. The marking composition was dried to form a film coating 0.45 mil thick containing 0.1 gram of pigment per square foot. The coating rendered the yellow film opaque and white in color.

A photographic negative of a UPC symbol was placed in contact with the coating and a blue-white UPC marking was produced by a one-minute exposure to 2.75 milliwatts per square cm. of UV-light peaked at about 365 nm. The UPC marking viewed through the polyimide film consisted of greenish-blue lines on a yellow background.

The carrier film and the film coating were adhered to a black plastic bottle cap by momentarily heating the film coating to about 70° C. to soften its thermoplastic binder component and contacting it to the bottle cap. The greenish-blue and yellow UPC marking obscured the blackness of the bottle cap and appeared unchanged after several days exposure to daylight. The symbol had excellent light stability and was capable of successful reading by a red HeNe laser scanning system at a checkout counter in a supermarket.

EXAMPLE 2

The general procedure of Example 1 was repeated except that a transparent "Mylar" polyester film carrier support was used instead of the polyimide film. Upon coating the film with the marking composition and exposing it to the patterned UV light blue-white UPC markings could be seen either viewing directly or viewing through the film. Upon adhering the marking and protective polyester film carrier support to a black bottle cap as in Example 1 a blue-white marking was viewable. This symbol could be photofixed by exposure to visible light, e.g., on a supermarket shelf, and could be read by a laser scanner. The marking, being more subject to fading with time than the polyimide film-protected marking of Example 1, is particularly useful for marking fast-moving, perishable items such as baked goods.

EXAMPLE 3

A marking composition similar to that described in Example 1 except that the titanium dioxide pigment is present in the amounts indicated for the five samples listed in the table. Also listed in the table are amount(g) of pigment per square foot in the photosensitive film coating. After exposing as described in Example 1, the values for $R_L$, percent reflectance of the light background, and $R_D$, percent reflectance of the dark background are measured in a MacBeth densitometer and the Print Contrast Signal (PCS) values, as defined in UPC Symbol Specification Document (May 1973), are determined using the formula: $PCS = (R_L\% - R_D\%/R_L\%)$.

TABLE

| Sample | TiO$_2$ Pigment (%) | Film Coating Weight (g/sq.ft.) | Wt. TiO$_2$ (g/sq.ft.) | $R_L$(%) | $R_D$(%) | PCS |
|---|---|---|---|---|---|---|
| (a) | 10 | 1.1 | 0.11 | 38 | 2 | 0.95 |
| (b) | 12 | 1.2 | 0.14 | 33 | 2 | 0.94 |
| (c) | 20 | 1.2 | 0.24 | 50 | 8 | 0.84 |
| (d) | 26 | 1.3 | 0.34 | 55 | 11 | 0.80 |
| (e) | 34 | 1.25 | 0.42 | 55 | 35 | 0.36 |

The imaged film samples can be adhered to a variety of substrates, e.g., black plastic bottle caps, glass and metallic reflective surfaces such as aluminum foil, and transparent packaging films and the resulting composites (a) to (d) above can be successfully machine scanned. Composite (e) while not successfully machine scannable is, however, eye readable.

EXAMPLE 4

Release Coating

A coating of the composition described in Example 1 but containing 17% TiO$_2$ pigment is coated with a 0035 wire wound rod onto a release paper obtained from the Packaging Division of Ludlow Paper Co. (Mt. Holyoke, Mass.) at a coating weight of 1.04 g/sqft. The paper coating is exposed through a high contrast photographic negative of a UPC symbol to ultra violet light to form an intense blue-white image. This image is thermally transferred onto a black printed card used to measure paint coverage with a reflectance density of 2.0. The composite of photosensitive coating and black card gives a high contrast image with a dark area reflectance of 4, light area reflectance of 29 (corresponding to optical densities of 1.3 and 0.5, respectively), and the PCS of 0.86 is determined by the formula set forth in Example 3. The image is machine scannable.

I claim:

1. A marking transfer sheet comprising an imaging layer on a carrier support, the imaging layer comprising
   (a) a radiation-sensitive composition which, upon exposure to radiation, is capable of forming a colored substance that can absorb at least a portion of the wavelength of light in the visible spectrum, the radiation-sensitive composition being present in an amount sufficient to produce, upon exposure to radiation, a detectable difference in diffuse reflectance density between exposed and unexposed areas,
   (b) pigment capable of diffusely reflecting the wavelengths of light absorbed by the colored substance, the pigment being present in a density of about from 0.05 to 0.34 gram per square foot, and
   (c) radiation-transmissive, colorless, polymeric, film-forming, thermoplastic binder.

2. A marking transfer sheet of claim 1 wherein the imaging layer has a thickness of about from 0.2 to 0.8 mil.

3. A marking transfer sheet of claim 2 wherein the imaging layer has a thickness of about from 0.2 to 0.5 mil.

4. A marking transfer sheet of claim 1 wherein the radiation-sensitive composition forms a colored substance upon exposure to ultraviolet light.

5. A marking transfer sheet of claim 4 wherein the colored substance is fixed upon exposure to light.

6. A marking transfer sheet of claim 1 wherein the pigment is a heavy metal oxide.

7. A marking transfer sheet of claim 6 wherein the pigment consists essentially of TiO$_2$.

8. A marking composition of claim 1 wherein the carrier support exhibits UV absorbance sufficient to impede the imaging of the radiation-sensitive component through the carrier support.

9. A marking transfer sheet of claim 1 further comprising at least about 1% by weight of the thermoplastic binder, of UV light absorber.

* * * * *